United States Patent [19]

Duran

[11] Patent Number: 4,747,738
[45] Date of Patent: May 31, 1988

[54] CAPTIVE PANEL FASTENER ASSEMBLY

[75] Inventor: John A. Duran, Glendora, Calif.

[73] Assignee: Avilbank Mfg., Inc., Burbank, Calif.

[21] Appl. No.: 914,884

[22] Filed: Oct. 3, 1986

[51] Int. Cl.[4] .............................................. F16B 21/18
[52] U.S. Cl. ..................................... 411/353; 411/107; 411/502
[58] Field of Search ................................. 411/103–106, 411/107, 352, 353, 282, 999, 501–504; 24/141

[56] References Cited

U.S. PATENT DOCUMENTS

| | | | |
|---|---|---|---|
| 1,251,676 | 1/1918 | McCaffray | 411/999 |
| 2,286,981 | 6/1942 | Todd | 411/282 |
| 2,948,317 | 8/1960 | Munro | 411/352 |
| 3,765,465 | 10/1973 | Gulistan | 411/999 |
| 3,995,675 | 12/1976 | Cosenza | 411/353 |
| 4,069,855 | 1/1978 | Petroshanoff | |
| 4,464,090 | 8/1984 | Duran | 411/103 |

*Primary Examiner*—Neill Wilson
*Attorney, Agent, or Firm*—Poms, Smith, Lande & Rose

[57] ABSTRACT

A captive panel fastener assembly for joining a panel to a sub-structure. The fastener assembly includes a sleeve bolt, a grommet assembly which is attached to the panel and a receptacle assembly which is attached to the sub-structure. The sleeve bolt passes through the grommet assembly and engages the receptacle assembly thereby joining the panel and the sub-structure. The bolt includes an enlarged head and a threaded shank with a pair of slots extending longitudinally along the outer periphery of the shank. A C-shaped ring is trapped in the grommet assembly and has a pair of inwardly extending ends riding in the slots. In this manner, when the grommet assembly is installed in an aperture in the panel, which may be the skin of an aircraft panel, the bolt can be pushed between positions whereby, in a first position, the grommet assembly and C-ring are at one end of the shank holding the head and shank outwardly from the aircraft panel and, in a second position, the C-ring rides along the slots and abuts against the head so that the remaining threaded shaft can extend through the aperture with a stud on the receptacle assembly threaded thereon securing the panel to the sub-structure. An enlargement is provided along the slots adjacent the terminal end of the shank but spaced therefrom for forcing the ring upwardly when it engages the enlargement, then allowing the ring to grab down between the terminal end of the shank and the enlargement. This assures good retention of the C-ring with little play between the grommet assembly and the shaft resulting in maximum engagement and strength. Thus, the sleeve bolt is retained in the panel and remains in its withdrawn position when the panel is disengaged from the substructure.

29 Claims, 5 Drawing Sheets

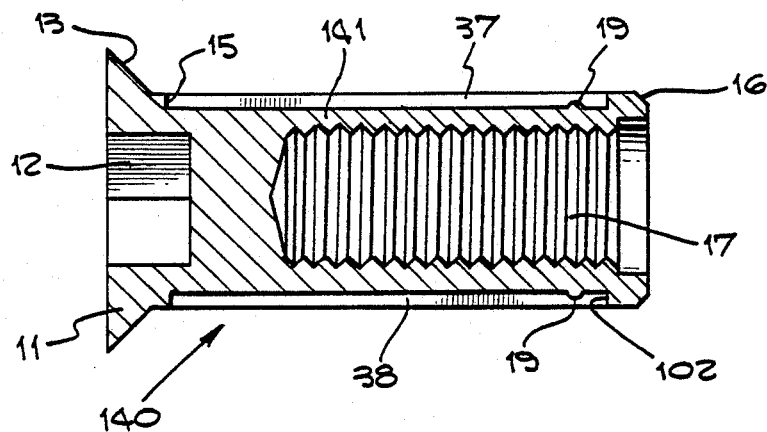
Fig. 8.
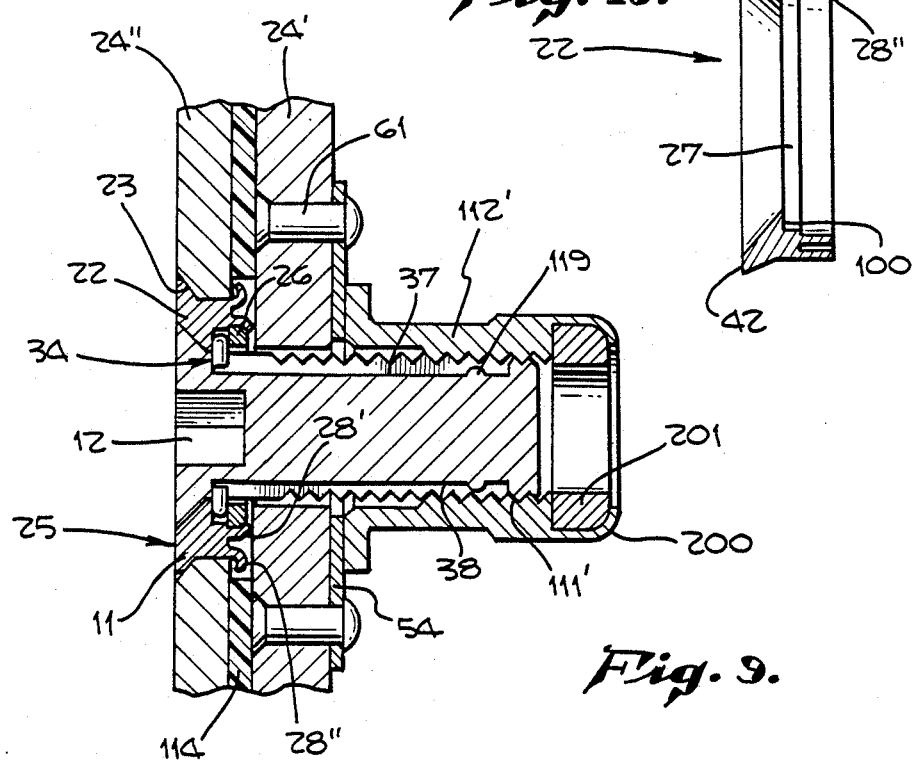
Fig. 13.
Fig. 9.

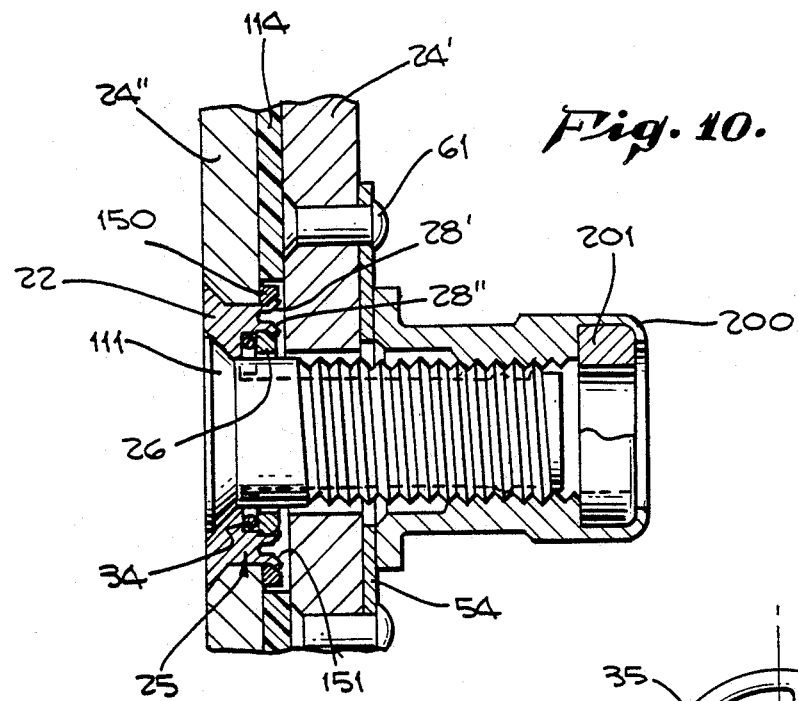
Fig. 10.
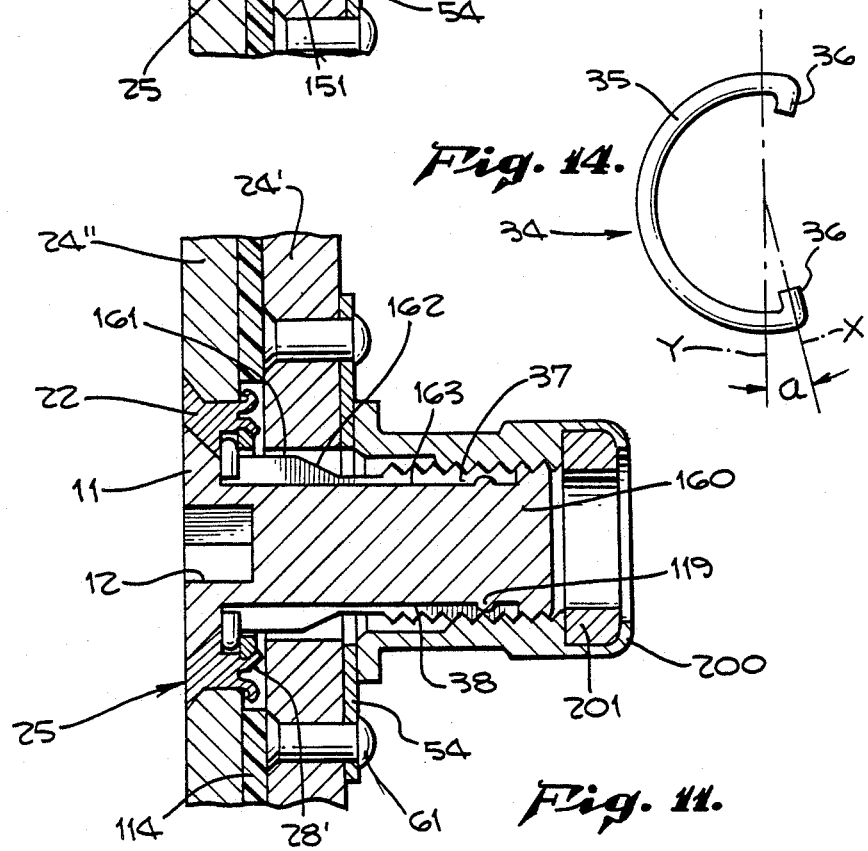
Fig. 14.
Fig. 11.

CAPTIVE PANEL FASTENER ASSEMBLY

BACKGROUND OF THE INVENTION

1. Field of the Invention

The invention relates to captive panel fastener assemblies; and, more particularly, to an improved fastener assembly for aircraft for holding the head and shank of the bolt of the fastener assembly away from an aperture in a panel of the aircraft in a first position while permitting the bolt to be pushed to a second position where the head abuts against the aircraft and the shank enters the aperture in the aircraft and may be threaded to a receptacle assembly mounted to a substructure.

2. Description of the Prior Art

Panel fasteners for aircraft are well known. Usually, such fasteners secure a panel to an aircraft by insertion through an opening in the aircraft panel and a nut attached to the panel on the blind side is threaded to the shaft of the fastener, the enlarged head abutting against the panel on the access side thereof. Means have been suggested in the prior art for preventing the fastener from becoming disengaged from the panel when the fastener is threaded out of engagement with the nut. For example, in U.S. Pat. No. 4,069,855 to Petroshanoff, the fastener is captivated to the panel by a retaining ring which includes integral tabs that ride within crosschannels and an installation slot extending intermediate the ends of the fastener. However, in this arrangement, the ring eats or bites into the threads of the shank wearing out the same and destroying its utility. It may then have to be drilled out of the panel aperture resulting in lost man hours.

In U.S. Pat. No. 4,464,090 to John A. Duran, commonly assigned, there is disclosed an improved captive panel fastener which can hold the head and shank of the fastener to the panel prior to installation while permitting pushing of the head and shank into the aperture to engage a nut without damaging the threads of the shank.

In the invention disclosed in U.S. Pat. No. 4,464,090, a captive panel fastener is provided having an enlarged head and a threaded shank with a pair of slots extending longitudinally along the outer periphery of said shank through the threads thereof. A C-shaped ring is trapped in a grommet assembly and has a pair of inwardly extending ends riding in the slots. In this manner, when the grommet assembly is installed in an aperture, such as in the skin of an aircraft panel, the fastener can be pushed between positions whereby, in a first position, the grommet assembly and C-ring are at one end of the shank holding the head and shank outwardly from the aircraft panel, and, in a second position, the C-ring rides along the slots and abuts against the head so that the remaining threaded shaft can extend through the aperture with a nut threaded thereon securing the fastener to the panel.

The shaft of the fastener in U.S. Pat. No. 4,464,090 is externally threaded. However, there is a need in the aircraft industry for captive panel fasteners having shafts with either internal threads or stepped or tapered bodies. Further, in U.S. Pat. No. 4,464,090, the fit of the C-ring in the groove of the shaft and the grommet is such that a certain amount of play is present. There is a need for a captive panel fastener which can hold the head and shank thereof, which shank may be tapered or straight, or internally or externally threaded, away from an aperture in an aircraft panel or the like, prior to installation, in a firm stable manner. This would result in good retention of the C-ring in the fastener with little play between the grommet assembly and the shaft resulting in maximum engagement and strength.

SUMMARY OF THE INVENTION

It is an object of this invention to provide an improved captive panel fastener assembly which can hold the head and shank of the bolt away from an aperture in an aircraft panel or the like, prior to installation, in a firm, stable manner.

It is another object of this invention to carry out the foregoing object while permitting the bolt of the fastener assembly to be pushed through the aperture until the shank engages a receptacle assembly mounted to a substructure.

It is a further object of this invention to carry out the foregoing objects wherein the shank of the bolt of the fastener assembly is externally or internally threaded, stepped or tapered.

These and other objects are preferably accomplished by providing a captive panel fastener assembly for joining a panel to a sub-structure. The fastener assembly includes a sleeve bolt, a grommet assembly which is attached to the panel and a receptacle assembly which is attached to the sub-structure. The sleeve bolt passes through the grommet assembly and engages the receptacle assembly thereby joining the panel and the sub-structure. The bolt includes an enlarged head and a threaded shank with a pair of slots extending longitudinally along the outer periphery of the shank. A C-shaped ring is trapped in the grommet assembly and has a pair of inwardly extending ends riding in the slots. In this manner, when the grommet assembly is installed in an aperture in the panel, which may be in the skin of an aircraft panel, the bolt can be pushed between positions whereby, in a first position, the grommet assembly and C-ring are at one end of the shank holding the head and shank outwardly from the aircraft panel and, in a second position, the C-ring rides along the slots and abuts against the head so that the remaining threaded shaft can extend through the aperture with a stud on the receptacle assembly threaded thereon securing the panel to the sub-structure. An enlargement is provided along the slots adjacent the terminal end of the shank but spaced therefrom for forcing the ring upwardly when it engages the enlargement, then allowing the ring to grab down between the terminal end of the shank and the enlargement. This assures good retention of the C-ring with little play between the grommet assembly and the shaft resulting in maximum engagement and strength. Thus, the sleeve bolt is retained in the panel and remains in its withdrawn position when the panel is disengaged from the substructure.

BRIEF DESCRIPTION OF THE DRAWING

FIG. 8 is a view similar to FIG. 3 showing an alternate embodiment of one element of the fastener of FIGS. 1 to 6;

FIG. 9 is a view similar to FIG. 3 showing another embodiment of the fastener of FIGS. 1 to 6;

FIG. 10 is a vertical sectional view of the final installation of the fastener of FIG. 9 showing a washer installed thereon;

FIG. 11 is a view similar to FIG. 10 showing the final installation of tapered externally threaded bolt shaft;

FIG. 13 is a view taken along lines XIII—XIII of FIG. 1;

FIG. 14 is a plan view of one element of the device of FIGS. 1–6; and

DESCRIPTION OF THE PREFERRED EMBODIMENTS

Figure 1:
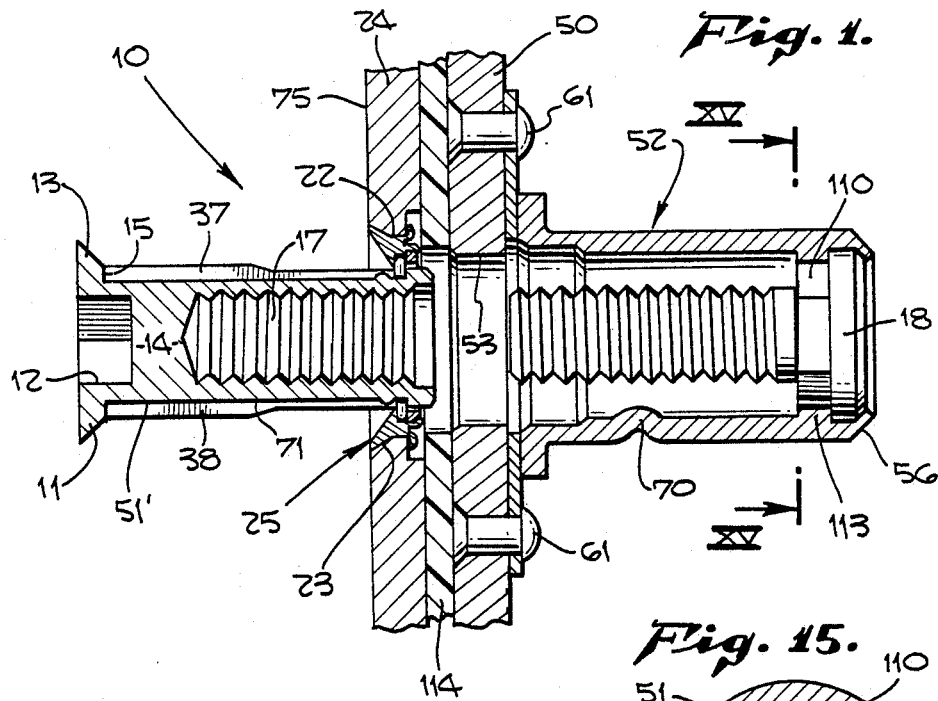
FIG. 1 is a side elevation view partly in section showing a panel fastener assembly in accordance with the invention associated with a panel and a sub-structure.
Figure 4:
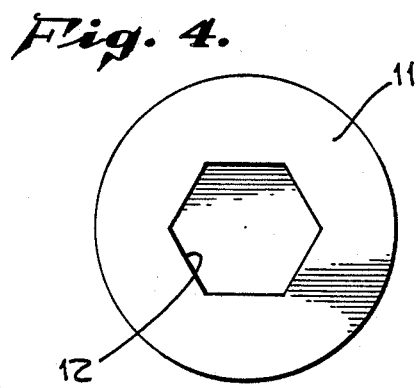
FIG. 4 is a view taken along lines IV—IV of FIG. 3.

Referring now to FIG. 1 of the drawing, a fastener assembly 10 in accordance with the invention is shown as associated with a structural panel 24 and a sub-structure 50. Grommet assembly 25 (see also FIG. 2) is shown installed in countersunk opening 23 in access panel 24. Assembly 10 is comprised of a bolt 51' having an enlarged bolt head 11 at one end having a countersunk hexagonally shaped cavity 12 (see also FIG. 4) adapted to receive therein a hexagonally shaped drive tool (not shown) such as a screw driver, allen wrench, or the like.

Head 11 may be flat or tapered, as at taper 13, on its undersurface leading to an integral bolt shank portion 14. A shoulder 15 is formed at the intersection of shank portion 14 and taper 13. Shank portion 14 terminates in a blunt-nosed leading end 16 (FIG. 3) and is threaded internally at threads 17 for receiving therein a threaded stud 51 of receptacle assembly 52. A shoulder 102 is formed at the end of shank portion 14 before end 16. Thus, bolt 51' is adapted to pass through grommet assembly 25 and engage and mate with stud 51 of receptacle assembly 52. Grommet assembly 25 is shown in exploded view in FIG. 2 as comprised of a grommet 22 and a retainer 26. Grommet assembly 25 is adapted to be mounted into opening 23 in the panel 24 of the aircraft panel 24 or the like as seen in FIG. 1.

Figure 2:
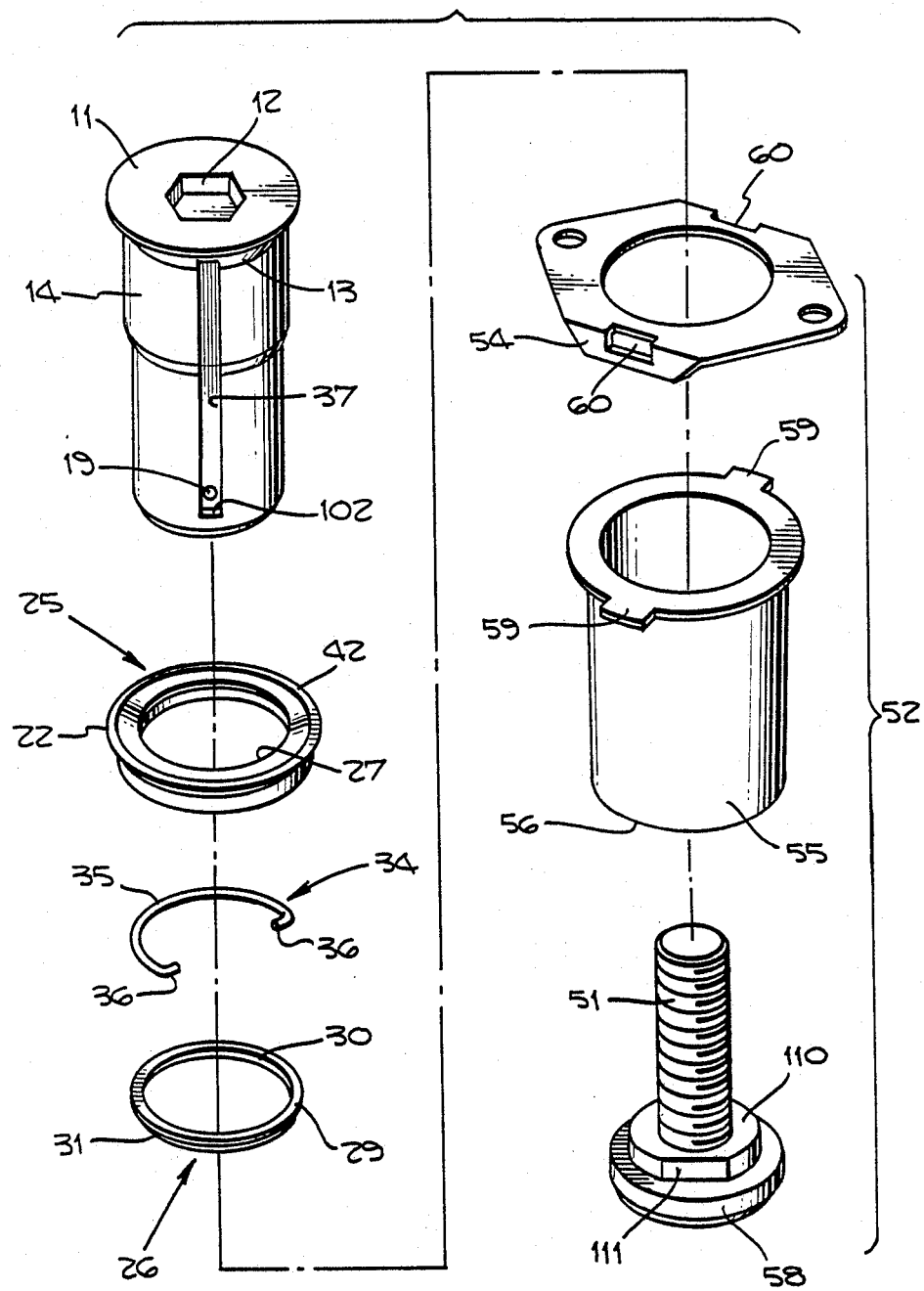
FIG. 2 is an exploded view of the fastener assembly of FIG. 1 in accordance with the teachings of the invention.

As shown in FIG. 2, grommet assembly 25 may be comprised of two mating parts of a suitable material, such as stainless steel, a first main grommet portion 22 and a mating retainer 26. Main grommet portion 22 is shown in FIG. 13 prior to assembly and is generally an annular ring and includes a central opening 27 having an inner wall 100 and an outer split ring 28 extending from one side thereof forming a pair of spaced fingers 28' and 28''. Retainer portion 26 (FIG. 2) includes a main generally annular body portion 29 surrounding a central opening 30 having a tapered outer peripheral edge 31.

A spring in the form of a C-shaped ring 34 (FIG. 14) fits into the grommet assembly 25, as will be discussed, and includes a main arcuate body portion 35 terminating in a pair of inwardly extending ends or legs 36. Legs 36 are adapted to ride in a pair of spaced longitudinal slots 37, 38 (see particularly FIG. 6) extending along shank portion 14 (see also FIG. 2) of the fastener 10. Legs 36 may have their central longitudinal axes x making an angle a of about 10° with a line y passing between the inner longitudinal faces of legs 36 as shown. Alternatively, the legs of the ring may be angled differently as shown in FIG. 7 wherein a modification of the substantially semi-circular ring 36 of FIG. 2 is shown. Thus, ring 39 of FIG. 7 also has a main arcuate body portion 40 terminating in inwardly extending ends or legs 41. An angle b of approximately 110° may be provided between lines $x^1$ and $y^1$ passing through the longitudinal axes of legs 41.

Figure 6:
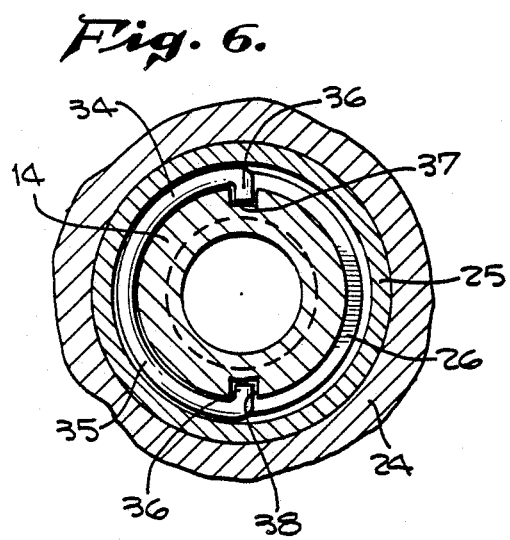
FIG. 6 is a view taken along lines VI—VI of FIG. 3.
Figure 7:
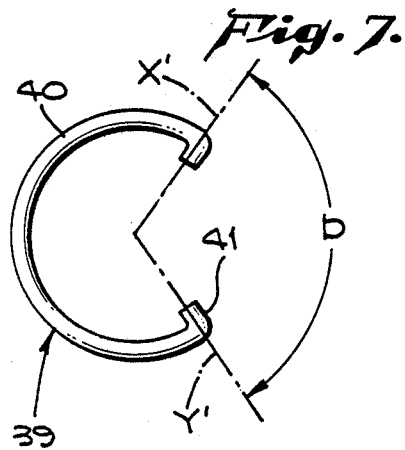
FIG. 7 is a plan view of an alternate ring element.

In both rings 34 and 39, the terminal ends or legs 36, 41 may be blunted and both rings 34 and 39 are mounted in the fastener 10 similarly, as will be discussed, and ride in slots 37,38 as shown in FIG. 6. Thus, only the assembly and function of ring 34 will be described but it is to be understood that such discussion is also applicable to ring 39 of FIG. 7. However, the angularity of slots 37, 38 may be varied to accommodate the angularity of legs 41 of ring 40. In any event, it is obvious that the dimensions and configuration of rings 34 and 39 and the angularity of their respective legs may be varied, with the depth and angularity of the receiving slots 37,38 also varied to accommodate the same.

In assembling the ring 34 of FIG. 2 to the retainer 26 and grommet assembly 25, grommet portion 22 is inserted into opening 23 (FIG. 1) in the aircraft skin 24 from the top side thereof in FIG. 1. The face 42 (FIG. 13) of grommet portion 22 is also disposed on the top side of aircraft skin panel 24 (FIG. 1).

Figure 3:
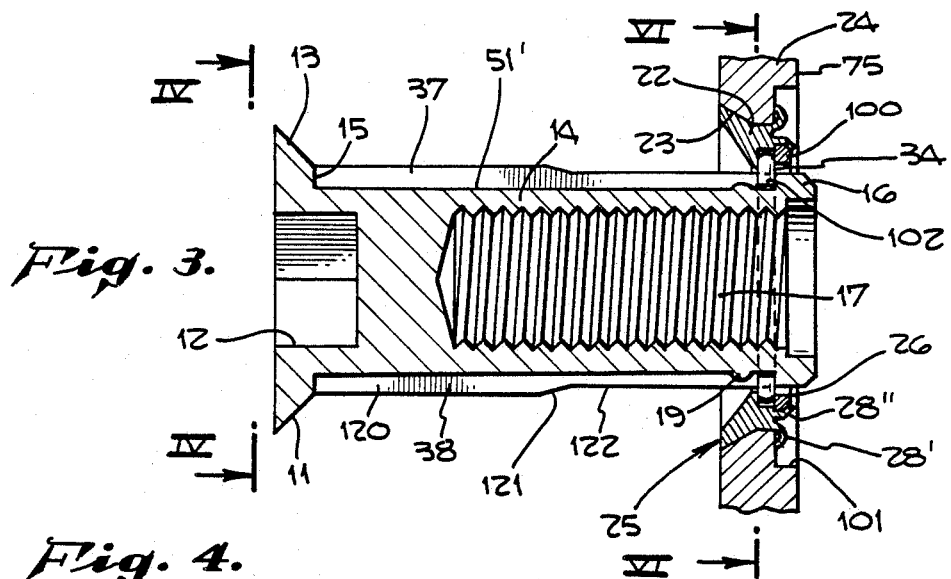
FIG. 3 is a vertical sectional view of the fastener of FIGS. 1 and 2 shown in hold out position.

The ring 34 is now placed against surface 100 of grommet portion 22 so that legs 36 enter slots 37, 38 of bolt 51' as shown in FIG. 6. Retainer portion 26 is now placed against ring 34, as shown in FIGS. 1 and 3, and lip 28'' (FIG. 13) is swaged against tapered surface 31 of retainer 26, as seen in FIGS. 1 and 3, to thereby retain the ring 34 between retainer 26 and grommet portion 22. As seen in FIG. 3, the outer panel of skin 24 may be undercut, at 101, and lip 28' may be swaged thereagainst, as seen in FIG. 3, to hold the grommet portion 22 (and thus, grommet assembly 22 and ring 34) against skin 24. The swaging of lips 28' and 28'' thus secures the retainer 26, ring 34 and grommet portion 22 together while sandwiching panel or skin 24 therebetween and holding ring 34 within grommet portion 22.

Although a specific type of grommet assembly has been discussed, obviously other grommet arrangements may be used as long as it retains the ring 34 in position in the aircraft skin and as will be discussed further.

Figure 5:
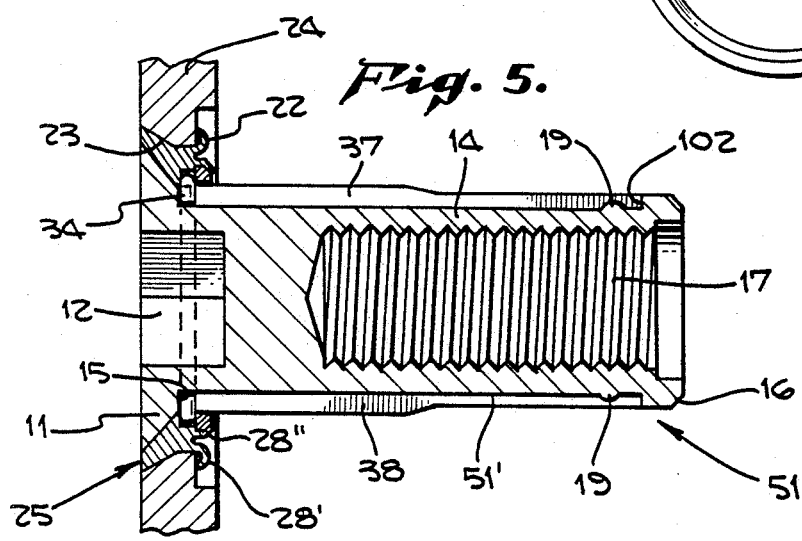
FIG. 5 is a view similar to FIG. 3 showing the final installation position of the fastener prior to securing to the receptacle assembly.

Thus is can be seen in FIG. 3 that the grommet portion 22 serves to retain ring 34 in a position whereby the shank portion 14 and head 11 of the bolt 51 of fastener assembly 10 extends away from the aircraft panel 24 at the same time the bolt 51' is captivated in the panel 24. In this manner, the bolt 51' cannot become displaced from the panel and excessive play between the grommet and the shank is eliminated. The final installed position of the bolt 51' is shown in FIG. 5 wherein the bolt 51 has been pushed or moved to the right in FIG. 3 (to the FIG. 5 position) with ring 34 moving along the slots 37,38 in shank portion 14 until it abuts against shoulder 15 of bolt head 11.

The ring 34 (and, of course, ring 39 of FIG. 7) also functions to hold the bolt 51' in the FIG. 3 position when it is pulled out of the aperture in the aircraft skin. The stud 51 of receptacle assembly 52 (FIG. 1) is engaged by pushing the bolt 51 to the right in FIGS. 1 and 3 to the final installed FIG. 1 position where stud 51 can be threaded into the shank 14. A countersunk hole 53 in subpanel 50 is aligned with countersunk hole 23 in top panel 24. Although one or both of these panels 50, 24 may be of composite material, or be relatively thin, of course any suitable panels may be secured together in accordance with the teachings of the invention.

Figure 15:
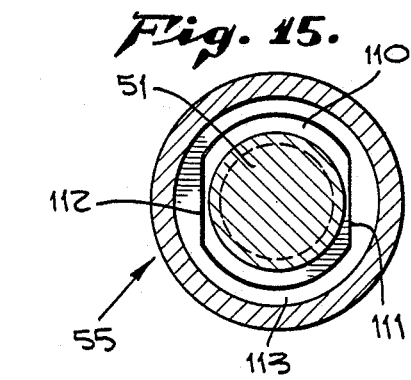
FIG. 15 is a view taken along lines XV—XV of FIG. 1.

Receptacle assembly 52 (see particularly FIG. 2) includes a receptacle bracket or basket 54, a barrel 55 and aforementioned externally threaded stud 51. As seen in FIG. 1, the lower end 56 of barrel 55 is crimped about he base 58 of stud 51 to engage the stud 51 and connect the barrel 55 thereto. As seen in FIG. 2, the stud 51 has a boss 110 with flattened areas 111, 112 (see also FIG. 15). As seen in FIG. 1, barrel 55 has an inwardly extending peripheral wall 113 configured similarly to boss 110 (FIG. 15). This is an anti-rotation feature preventing stud 51 from rotating within barrel 55 thereby allowing the stud 51 and barrel 55 to mate and lock and act as one unitary element. Barrel 55 also includes the 59 which are inserted in a pair of slots 60 formed in basket 54, thereby connecting the barrel 55 to the basket 54. Slots 60 are circumferentially greater in length than the width of tabs 59 thereby permitting the barrel 55 and stud 51 to rotate to a limited degree with respect to basket 54. Basket 54 is secured to sub-structure 50 (FIG. 1) by any suitable means, such as rivets 61. Although receptacle assembly 52 and basket 54 have been described as an assembly of individual components, obviously a single element may be used.

Sleeve bolt 51 is shown in FIG. 3 in its disengaged and withdrawn position with respect to panel 24.

It can also be seen that the retaining ring, either ring 34 or 39, performs two functions; it prevents the bolt 14 from coming out of the grommet and/or panel; and, at the same time, it traps the bolt 14 so it remains in the out position shown in FIGS. 1 and 3. This is of course accomplished by means of the two slots 37,38 and the legs 41 or 36. The slots 37,38 extend from shoulder 15 to shoulder 102 and are essentially the same depth at all locations therealong, except for the area provided by the enlargement or bump 19 on shank 14. The bump 19 forces ring 34 up when ring 34 engages bump 19 and ring 34 thus stays up and within the area shown in FIG. 3 between the abutting bump 19, shoulder 102, slots 37,38, retainer 26 and grommet portion 22. The bump 19 thus forces ring 34 up and allows it to come down and grab into the area shown in FIG. 3 maintaining the bolt 14 in the FIG. 3 position.

As can be seen in FIG. 3, bolt 14 is a tapered bolt shaft having a first portion 120, leading from head 11, then tapering at taper 121 to a second portion 122 of lesser outer diameter than portion 120. Of course, bolt 14 may be straight or uniform in diameter along the outer surface as seen in FIG. 8 wherein like numerals refer to like parts of FIGS. 1–6. Thus, bolt 140 in FIG. 8 may have a bolt shaft 141 internally threaded, as bolt 14 by FIG. 1, with a uniform outer diameter as shown. Of course, the assembly of bolt 140 to the grommet assembly of FIGS. 1 to 6 is identical.

Although an internally threaded bolt shaft is disclosed in the embodiment of FIGS. 1 to 8, as seen in FIG. 9, wherein like numerals refer to like parts of FIGS. 1 to 8, shaft 110 may be straight and externally threaded, as at outer threads 111', receiving thereon a self threading nut 112'. In this embodiment, barrel 55 and stud 51 are combined into a single nut 112 connected to basket 54 as heretofore described in the connection of barrel 55 and a swaged end 200 swaging against a plastic insert 201. This insert 201 may be of a suitable material, such as a polyimide resin, into which bolt threads 111' bite when threaded to nut 112' to provide a friction lock as discussed hereinbelow with respect to protrusions 70. Nut 112' thus threads onto threads 111' and has basket 54 adapted to bear against aircraft panel or skin 24' retaining resilient gasket 114 between skin 24' and skin 24" all as known in the art. Of course, bump 119 forces ring 34 up when nut 112' is unthreaded and bolt shaft 110 is moved to the left in FIG. 9 with ring 34 assuming the same position shown in FIG. 3 so that no further illustration is deemed necessary.

Figure 12:
FIG. 12 is a plan view of the washer along of FIG. 11.

As seen in FIG. 9, resilient gasket 114 is provided between skins 24' and 24". Such gasket 114, as seen in FIG. 1, may be used in all embodiments, as shown, if desired. Also, as shown in FIG. 10, wherein like numerals refer to like parts of FIG. 9, a washer 150 (see also FIG. 12) having a tapered outer surface 151 is disposed between grommet portion 22 and panel 24", the lip 28' of grommet portion 22 being swaged to retain washer 150 therebetween. The washer 150 is preferably of a material compatible with the material of the panels 24', 24". Thus, if the panels 24', 24" are of composite material, washer 150 is preferably of composite material thereby distributing the load on panels 24', 24" over a wide area and eliminating cracking or delamination of the composite panels.

Gasket 114 may be eliminated, if desired. Also, as seen in FIG. 11, wherein like numerals refer to like parts of the embodiment of FIGS. 9 and 10, the bolt shaft 160 may be tapered and externally threaded. Of course, gasket 114 maybe eliminated and the shape of the overall bolt, such as body portions 161, 162 and 163, may be similar to the like body portions 120, 121 and 122 of the embodiment of FIG. 3.

Referring to all embodiments, rotation of the sleeve bolts will cause them to threadably engage either stud 51 or the threaded interior of the nut of the receptacle assembly 52 or preferably, the bolts 11 and studs or nuts are provided with double lead threads in order to decrease the time and motion required to remove and install the panel.

Barrel 55 may include inwardly facing protrusions 70 (FIG. 1) which functionally engage the exterior surface 71 of sleeve bolt 51' when it is threadably engaged on stud 51 thereby securely locking the sleeve bolt 51' to receptacle assembly 52 when panel 24 is secured to sub-structure 50. In the preferred embodiment, these protrusions 70 are preferably formed by deforming the exterior of barrel 55 but any suitable friction lock preventing relative rotation between the internal surface of barrel 55 and the external surface 71 of bolt 51' may be provided, such as a plastic insert installed through the side of barrel 55 or protrusions on the threads of the bolt.

As heretofore discussed, the grommet assembly 25 may be flush with the surface 75 (FIG. 3) of panel 24. However, in some applications, the thickness of panel 24 and sealing requirements may necessitate the use of a gasket 114 as heretofore discussed between the panel 24 and sub-structure 50.

It can be seen that there is disclosed a panel fastener adapted to be held in a position whereby the head of the fastener can be held at the panel with the shaft thereof extending away from the panel or the head is held away from the panel with the shaft held at the panel. Little, if any, play is provided and the bolt shaft can be tapered with internal or external threads, or straight with either external or internal threads. The unique bump and slot and grommet assembly arrangement in all embodiments forces the resilient ring, which rides in the slots, upwardly where it remains up and grabs in the area between the bump and the grommet assembly resulting in a firm, positive retention with little if any play between the grommet assembly and the shaft.

Although a specific grommet assembly has been disclosed, obviously other assemblies may be used such as those disclosed in U.S. Pat. No. 4,464,090. Also, although an enlargement or bump 19 in the shank has been disclosed, any means may be used for increasing the diameter at that point so as to force the ring up as it moves along the slots.

There is thus disclosed a new and unique captive panel fastener which holds the head and shaft of the fastener out away from an aircraft panel prior to installation in a firm, secure manner eliminating play between the grommet assembly and the shaft.

Although a specific receptacle assembly has been described, any suitable receptacle assembly may be used.

Although I have described the fastener assembly with reference to certain preferred embodiments, it is to be understood that the appended claims describe the scope of the invention and various changes and modifications may occur to one skilled in the art without departing from the scope of the invention.

I claim:

1. In a captive panel fastener assembly comprising a threaded shank portion, an enlarged head at one end of the shank portion, a retaining member including a grommet assembly trapping a generally C-shaped spring ring therein, said ring adapted to rotate together with said shank portion and having a main arcuate body portion terminating in inwardly extending ends, said shank portion having at least a pair of longitudinally extending slots receiving therein the ends of said ring therein whereby, when said ring is at the terminal end of said shank portion, the remainder of said shank portion and said head extend away from said ring, and when the ends of said ring are moved axially along said shank portion in said slots, said ring abuts against said head with the remaining portion of said shank portion extending away from said ring, said bolt being adapted to engage a receptacle assembly mounted in an adjacent subpanel, the improvement which comprises:

said slots extending from the head of said fastener to the terminal end thereof, and an enlargement along each of said pair of slots adjacent the terminal end of said shank portion but spaced therefrom, the outer diameter of said shank portion through the portion of said slots between said enlargement and the terminal end of said shank portion being substantially the same as the outer diameter of said shank portion through the portion of said slots between said enlargement and the head of said fastener, the outer diameter of said shank portion at said enlargement being substantially greater than the outer diameter of the remaining portions of said shank portion whereby said ring is adapted to grab down within the area of said slots between said enlargement and the terminal end of said shank portion to maintain said shank grommet assembly, said grommet assembly being comprised of a retainer portion and a grommet portion, said retainer portion and said grommet portion forming an annular member trapping said ring therebetween, said grommet portion having an internal shoulder receiving said ring thereagainst with said retainer portion abutting against said ring, said grommet portion further including at least a pair of bendable fingers extending from said shoulder, one of said fingers being adapted to overlie and bear against said retainer portion to sandwich said ring between said grommet portion and said retainer portion, the other of said fingers being adapted to overlie and bear against a panel in which said fastener may be assembled.

2. In a captive panel fastener assembly extending through an aperture in the skin of an aircraft comprising a bolt having a threaded shank portion, an enlarged head at one end of said shank portion on the access side of said skin and a retaining member secured to said shank portion, said retaining member including a grommet assembly sandwiching said panel surrounding said aperture therebetween and trapping therein a generally C-shaped spring ring, said ring adapted to rotate together with said shank portion and having a main arcuate body portion terminating in inwardly extending ends, said shank portion having at least a pair of longitudinally extending slots receiving therein the ends of said ring therein whereby, when said ring is at the terminal end of said shank portion, the remainder of said shank portion and said head extend away from said ring trapped in said grommet mounted in said aperture, and when the ends of said ring are moved axially along said shank portion in said slots, said ring abuts against said head with the remaining portion of said shank portion extending away from said head and said ring through said aperture into the blind side of said skin and into threaded engagement with a fastening member threaded to said shank portion on the blind side of said skin, the improvement which comprises:

said slots extending from the head of said fastener to the terminal end thereof, and an enlargement along each of said pair of slots adjacent the terminal end of said shank portion but spaced therefrom, the outer diameter of said shank portion through the portion of said slots between said enlargement and the terminal end of said shank portion being substantially the same as the outer diameter of said shank portion through the portion of said slots between said enlargement and the head of said fastener, the outer diameter of said shank portion at said enlargement being substantially greater than the outer diameters of the remaining portions of said shank portion whereby said ring is adapted to grab down within the area of said slots between said enlargement and the terminal end of said shank portion to maintain said shank portion in a position extending outwardly from said grommet assembly, said grommet assembly being comprised of a retainer portion and a grommet portion, said retainer portion and said grommet portion forming an annular member trapping said ring therebetween, said grommet portion having an internal shoulder receiving said ring thereagainst with said retainer portion abutting against said ring, said grommet portion further including at least a pair of bendable fingers extending from said shoulder, one of said fingers overlying and bearing against said retainer portion to sandwich said ring between said grommet portion and said retainer portion, the other of said fingers overlying and bearing against said skin.

3. In a captive panel fastener assembly extending through an aperture in the skin of an aircraft comprising a bolt having a threaded shank portion, an enlarged head at one end of said shank portion on the access side of said skin and a retainer member secured to said shank portion, said retaining member including a grommet assembly sandwiching said panel surrounding said aperture therebetween and trapping therein a generally C-shaped spring ring, said ring adapted to rotate together with said shank portion and having a main arcuate body portion terminating in inwardly extending ends, said shank portion having at least a pair of longitudinally extending slots receiving therein the ends of said ring therein whereby, when said ring is at the terminal end of said shank portion, the remainder of said shank portion and said head extend away from said ring trapped in said grommet mounted in said aperture, and when the ends of said rings are moved axially along said shank portion in said slots, said ring abuts against said head with the remaining portion of said shank portion extending away from said head and said ring through said aperture into the blind side of said skin and into threaded engagement with a fastening member threaded to said shank portion on the blind side of said skin, the improvement which comprises:

said slots extending from the head of said fastener to the terminal end thereof, and an enlargement along each of said pair of slots adjacent the terminal end of said shank portion but spaced therefrom, the outer diameter of said shank portion through the portion of said slots between said enlargement and the terminal end of said shank portion being substantially the same as the outer diameter of said shank portion through the portion of said slots between said enlargement and the head of said fastener, the outer diameter of said shank portion at said enlargement being substantially greater than the outer diameters of the remaining portions of said shank portion whereby said ring is adapted to grab down within the area of said slots between said enlargement and the terminal end of said shank portion to maintain said shank portion in a position extending outwardly from said grommet assembly, said grommet assembly being comprised of a retainer portion and a grommet portion, said retainer portion and said grommet portion forming an annular member trapping said ring therebetween, said grommet portion having an internal shoulder receiving said ring thereagainst with said retainer portion abutting against said ring, said grommet portion further including at least a pair of bendable fingers extending from said shoulder, one of said fingers overlying and bearing against said retainer portion to sandwich said ring between said grommet portion and said retainer portion, a washer disposed between said skin and said grommet portion abutting against said skin, the other of said fingers overlying and bearing against said washer thereby retaining it against said skin.

4. In the assembly of claim 3 wherein said skin is of a composite material and said washer is made of the same material as said skin.

5. In a captive panel fastener assembly extending through an aperture in the skin of an aircraft comprising a bolt having a threaded shank portion, an enlarged head at one end of said shank portion on the access side of said skin and a retaining member secured to said shank portion, said retaining member including a grommet assembly sandwiching said panel surrounding said aperture therebetween and trapping therein a generally C-shaped ring, said ring adapted to rotate together with said shank portion and having a main arcuate body portion terminating in inwardly extending ends, said shank portion having at least a pair of longitudinally extending slots receiving therein the ends of said ring therein whereby, when said ring is at the terminal end of said of said shank portion, the remainder of said shank portion and said head extend away from said ring trapped in said grommet mounted in said aperture, and when the ends of said ring are moved axially along said shank portion in said slots, said ring abuts against said head with the remaining portion of said shank portion extending away from said head and said ring through said aperture into the blind side of said skin and into threaded engagement with a fastening member threaded to said shank portion on the blind side of said skin, the improvement which comprises:

said slots extending from the head of said fastener to the terminal end thereof, and an enlargement along each of said pair of slots adjacent the terminal end of said shank portion but spaced therefrom, the outer diameter of said shank portion through the portion of said slots between said enlargement and the terminal end of said shank portion being substantially the same as the outer diameter of said shank portion through the portion of said slots between said enlargement and the head of said fastener, the outer diameter of said shank portion at said enlargement being substantially greater than the outer diameters of the remaining portions of said shank portion whereby said ring is adapted to grab down within the area of said slots between said enlargement and the terminal end of said shank portion to maintain said shank portion in a position extending outwardly from said grommet assembly, said shank portion including a first portion of one outer diameter extending from said head, a second tapered portion extending from said first portion and a third portion of a second outer diameter extending from said head to the terminal end of said fitting, said one outer diameter being substantially greater than said second outer diameter, said shank portion being externally threaded between said head and said terminal end.

6. In a captive panel fastener assembly comprising a threaded shank portion, an enlarged head at one end of the shank portion, a retaining member including a grommet assembly trapping a generally C-shaped spring ring therein, said ring adapted to rotate together with said shank portion and having a main arcuate body portion terminating in inwardly extending ends, said shank portion having at least a pair of longitudinally extending slots receiving therein the ends of said ring therein whereby, when said ring is at the terminal end of said shank portion, the remainder of said shank portion and said head extend away from said ring, and when the ends of said ring are moved axially along said shank portion in said slots, said ring abuts against said head with the remaining portion of said shank portion extending away from said head and said ring, said bolt being adapted to engage a receptacle assembly mounted in an adjacent subpanel, the improvement which comprises:

said slots extending from the head of said fastener to the terminal end thereof, and a single enlargement along each of said pair of slots adjacent the terminal end of said shank portion but spaced therefrom, the outer diameter of said shank portion being essentially uniform between the head of said fastener and said enlargement and between said enlargement and said terminal end and the outer diameter of said shank through the portion of said slots between said enlargement and the terminal end of said shank portion being substantially the same as the outer diameter of said shank portion at said enlargement being substantially greater than the outer diameters of the remaining portions of said shank portion whereby said ring is adapted to slide uniformly and smoothly along said slots and grab down within the area of said slots between said enlargement and the terminal end of said shank portion to maintain said shank portion in a position extending outwardly from said grommet assembly.

7. In the fastener assembly of claim 6 wherein said grommet assembly is comprised of a retainer portion and a grommet portion, said retainer portion and said grommet portion forming an annular member trapping said ring therebetween, said grommet portion having an internal shoulder receiving said ring thereagainst with said retainer portion abutting against said ring, said grommet portion further including at least a pair of bendable fingers extending from said shoulder, one of said fingers being adapted to overlie and bear against said retainer portion to sandwich said ring between said grommet portion and said retainer portion, the other of said fingers being adapted to overlie and bear against a panel in which said fastener may be assembled.

8. In the fastener assembly of claim 6 wherein said shank portion includes a first portion of one outer diameter extending from the underside of said head, a second tapered portion extending from said first portion and a third portion of a second outer diameter extending from said head to the terminal end of said fitting, said one outer diameter being substantially greater than said second outer diameter.

9. In the fastener assembly of claim 8 wherein said shank portion is internally threaded.

10. In the fastener assembly of claim 6 wherein said shank portion is internally threaded.

11. In the fastener assembly of claim 6 wherein said shank portion is internally threaded.

12. In the fastener assembly of claim 6 wherein said shank portion is externally threaded between said head and said terminal end.

13. In the fastener assembly of claim 6 wherein said shank portion is tapered and externally threaded along a portion thereof.

14. In the fastener assembly of claim 6 wherein said terminal end is of a substantially greater outer diameter than the outer diameter of the remainder of said shank portion forming an abutment shoulder adapted to receive said ring thereagainst.

15. In the fastener assembly of claim 6 including frictional means associated with said receptacle assembly and said bolt for retarding relative rotation therebetween.

16. In the assembly of claim 6 wherein
said receptacle assembly includes a basket secured to said sub-panel, a barrel secured to said basket, and a stud extending through said barrel toward said bolt and engagable therewith thereby being adapted to secure said bolt releasably to said stud, said barrel being retained to said stud and anti-rotation means associated with both said stud and said barrel for preventing relative rotation therebetween.

17. In the fastener assembly of claim 16 including friction means associated with said bolt and said stud for retarding relative movement therebetween by providing a lock between said bolt and said stud when said bolt is threaded to said stud.

18. In a captive panel fastener assembly extending through an aperture in the skin of an aircraft comprising a bolt having a threaded shank portion, an enlarged head at one end of said shank portion on the access side of said skin and a retaining member secured to said shank portion, said retaining member including a grommet assembly sandwiching said panel surrounding said aperture therebetween and trapping therein a generally C-shaped spring ring, said ring adapted to rotate together with said shank portion and having a main arcuate body portion terminating in inwardly extending ends, said shank portion having at least a pair of longitudinally extending slots receiving therein the ends of said ring therein whereby, when said ring is at the terminal end of said shank portion, the remainder of said shank portion and said head extend away from said ring trapped in said grommet mounted in said aperture, and when the ends of said ring are moved axially along said shank portion in said slots, said ring abuts against said head with the remaining portion of said shank portion extending away from said head and said ring through said aperture into the blind side of said skin and into threaded engagement with a fastening member threaded to said shank portion on the blind side of said skin, the improvement which comprises:
said slots extending from the head of said fastener to the terminal end thereof, and a single enlargement along each of said pair of slots adjacent the terminal end of said shank portion but spaced therefrom, the outer diameter of said shank portion being essentially uniform between the head of said fastener and said enlargement and between said enlargement and said terminal end and the outer diamter of said shank through the portion of said slots between said enlargement and the terminal end of said shank portion being substantially the same as the outer diameter of said shank portion through the portion of said slots between said enlargement and the head of said fastener, the outer diameter of said shank portion at said enlargement being substantially greater than the outer diameters of the remaining portions of said shank portion whereby said ring is adapted to slide uniformly and smoothly along said slots and grab down within the area of said slots between said enlargement and the terminal end of said shank portion to maintain said shank portion in a position extending outwardly from said grommet assembly.

19. In the assembly of claim 18 wherein said grommet assembly is comprised of a retainer portion and a grommet portion, said retainer portion and said grommet portion forming an annular member trapping said ring therebetween, said grommet portion having an internal shoulder receiving said ring thereagainst with said retainer portion abutting against said ring, said grommet portion further including at least a pair of bendable fingers extending from said shoulder, one of said fingers overlying and bearing against said retainer portion to sandwich said ring between said grommet portion and said retainer portion, the other of said fingers overlying and bearing against said skin.

20. In the assembly of claim 18 wherein said grommet assembly is comprised of a retainer portion and a grommet portion, said retainer portion and said grommet portion forming an annular member trapping said ring therebetween, said grommet portion having an internal shoulder receiving said ring thereagainst with said retainer portion abutting against said ring, said grommet portion further including at least a pair of bendable fingers extending from said shoulder, one of saidf ingers overlying and bearing against said retainer portion to sandwich said ring between said grommet portion and said retainer portion, a washer disposed between said skin and said grommet portion abutting against said skin, the other of said fingers overlying and bearing against said washer thereby retaining it against said skin.

21. In the assembly of claim 20 wherein said skin is of a composite material and said washer is made of the same material as said skin.

22. In the assembly of claim 18 wherein said shank portion includes a first portion of one outer diameter extending from the underside of said head, a second tapered portion extending from said first portion and a third portion of a second outer diameter extending from said head to the terminal end of said fitting, said one outer diameter being substantially greater than said second outer diameter.

23. In the assembly of claim 22 wherein said shank portion is internally threaded.

24. In the assembly of claim 18 wherein said shank portion is internally threaded.

25. In the assembly of claim 18 wherein said shank portion is internally threaded.

26. In the assembly of claim 18 wherein said shank portion is tapered and externally threaded along a portion thereof.

27. In the assembly of claim 23 wherein said shank portion is externally threaded between said head and said terminal end.

28. In the assembly of claim 18 wherein said terminal end is of a substantially greater outer diameter than the outer diameter of the remainder of said shank portion forming an abutment shoulder adapted to receive said ring thereagainst.

29. In the assembly of claim 18 including frictional means associated with said bolt and said fastener member for retarding relative rotation therebetween.

* * * * *

UNITED STATES PATENT AND TRADEMARK OFFICE
CERTIFICATE OF CORRECTION

PATENT NO. : 4,747,738
DATED : May 31, 1988
INVENTOR(S) : John A. Duran

It is certified that error appears in the above-identified patent and that said Letters Patent are hereby corrected as shown below:

Title Page, left column, numbered paragraph 73, change "AVILBANK" to -AVIBANK-.

Signed and Sealed this

Twenty-seventh Day of December, 1988

Attest:

DONALD J. QUIGG

*Attesting Officer*  *Commissioner of Patents and Trademarks*